(12) United States Patent
Elliott

(10) Patent No.: US 8,948,982 B2
(45) Date of Patent: Feb. 3, 2015

(54) OPEN LOOP MACHINE MOTOR SPEED CONTROL BASED ON DOWNHILL SLOPE DETERMINATION

(71) Applicant: Caterpillar Inc., Peoria, IL (US)

(72) Inventor: Christopher Elliott, Apex, NC (US)

(73) Assignee: Caterpillar Inc., Peoria, IL (US)

( * ) Notice: Subject to any disclaimer, the term of this patent is extended or adjusted under 35 U.S.C. 154(b) by 135 days.

(21) Appl. No.: 13/755,877

(22) Filed: Jan. 31, 2013

(65) Prior Publication Data

US 2014/0214295 A1  Jul. 31, 2014

(51) Int. Cl.
*F16H 59/66* (2006.01)

(52) U.S. Cl.
CPC ..................... *F16H 59/66* (2013.01)
USPC ............ 701/50; 701/54; 701/55; 701/61

(58) Field of Classification Search
USPC .................. 701/50, 53, 54, 55, 56, 61, 65
See application file for complete search history.

(56) References Cited

U.S. PATENT DOCUMENTS

| | | | |
|---|---|---|---|
| 4,648,291 A * | 3/1987 | Klatt et al. ............... | 477/119 |
| 5,997,108 A | 12/1999 | Claussen et al. | |
| 6,240,356 B1 | 5/2001 | Lapke | |
| 6,299,263 B1 | 10/2001 | Uematsu et al. | |
| 6,349,253 B1 * | 2/2002 | Bellinger ................. | 701/53 |
| 6,368,247 B1 * | 4/2002 | Kondo ...................... | 477/47 |
| 7,134,985 B2 | 11/2006 | Watanabe et al. | |
| 7,460,941 B2 | 12/2008 | Sychra et al. | |
| 7,509,197 B2 | 3/2009 | Landes et al. | |
| 7,801,656 B2 | 9/2010 | Alvarez et al. | |
| 7,869,927 B2 | 1/2011 | Uematsu | |
| 2006/0069488 A1 * | 3/2006 | Sychra et al. ............ | 701/69 |
| 2006/0149450 A1 * | 7/2006 | Taffin ....................... | 701/51 |
| 2011/0125376 A1 * | 5/2011 | Chappell et al. ......... | 701/65 |
| 2011/0160969 A1 * | 6/2011 | Oguri et al. .............. | 701/52 |
| 2011/0320095 A1 | 12/2011 | Anderson et al. | |
| 2012/0215412 A1 | 8/2012 | Seymour et al. | |

FOREIGN PATENT DOCUMENTS

JP          07-179137          7/1995

* cited by examiner

*Primary Examiner* — Jason Holloway
(74) *Attorney, Agent, or Firm* — Leydig, Voit & Mayer, Ltd.

(57) ABSTRACT

A manner of managing operation of a machine is described for preventing damage/wear to movable machine components arising from operation of the machine/parts at excessive speed while the machine is traveling down a steep incline. The managing of the machine operation includes determining a downhill slope value in a machine direction of travel and then establishing a maximum commanded transmission output speed in accordance with the determined downhill slope value. Thereafter a maximum commanded gear ratio is established, for a transmission having a variable gear ratio, based upon the maximum commanded transmission output speed and a current engine speed. A controller compares the maximum commanded variable gear ratio to an operator requested gear ratio, and a target gear ratio is established for the variable gear ratio of the transmission based upon a minimum of the compared commanded variable gear ratio and the operator requested gear ratio.

20 Claims, 7 Drawing Sheets

$$x' \approx R_{spr}\, \omega_{spr} = R_{spr}\, \omega_e\, D_p/D_m\, /\, GR_{FD}$$

$$T_e \approx c_1\, \omega_e + c_2$$

Engine Braking Torque $T_{fd\_s}$ is approximately the motor torque times final drive ratio $((D_m * \Delta P) * \eta_m * GR_{fd})$.

OPEN LOOP MACHINE MOTOR SPEED CONTROL BASED ON DOWNHILL SLOPE DETERMINATION

TECHNICAL FIELD

This disclosure relates to limiting a machine speed, and more particularly, to overriding an operator requested machine speed while the machine is traveling down a relatively steep slope in the machine direction of travel.

BACKGROUND

Motor propelled heavy machinery, such as track-driven earth movers and other construction machinery, are sometimes required to operate on relatively steep slopes. When operators cause such vehicles to descend a steep grade, a variety of braking and arresting mechanisms are potentially activated to prevent out-of-specification operation leading to machine damage. Examples of potentially damaged components include braking systems as well as operating speed-sensitive components such as an engine, pump and/or hydraulic motor.

A number of control schemes have been proposed for controlling downhill machine speed on severe grades. For example, in Sychra et al., U.S. Pat. No. 7,460,941 a downhill incline and machine ground speed are determined and an amount of braking required to prevent the machine from exceeding a speed limit for the measured speed. In another example of a control scheme for a machine, a target speed is determined. Furthermore, a trigger condition is based upon a current grade exceeding a threshold. In response, controls are activated to prevent the machine from exceeding the target speed. Such controls include an engine brake and a transmission retarder.

One way to ensure that a machine does not encounter overspeed operating conditions that may harm moving parts of the engine and power train is to tune the machine to operate, once activated, according to a worst-case downhill slope scenario (e.g., traveling down the steepest anticipated slope, for example). However, operating a machine configured according to this assumed worst case slope leads to excessive machine braking on less steep slopes. This, in turn, leads to limit cycling of the control (where a repeating on/off behavior emerges as the machine is slowed excessively after the triggering condition is reached, then allowed to accelerate when the triggering condition no longer holds).

This and other shortcomings in the state of the art are addressed by aspects of an exemplary method and variable transmission assembly (including a controller thereof) described herein.

SUMMARY OF THE INVENTION

The disclosure describes, in one aspect, a method of managing operation of a machine to prevent movable machine components from reaching excessive speed while the machine is traveling down a steep incline. The method includes determining a downhill slope value in a machine direction of travel, and then establishing a maximum commanded transmission output speed in accordance with the determined downhill slope value. The method further includes establishing a maximum commanded gear ratio, for a transmission having a variable gear ratio, based upon the maximum commanded transmission output speed and a current engine speed, and then comparing the maximum commanded variable gear ratio to an operator requested gear ratio. The method furthermore includes establishing a target gear ratio for the variable gear ratio of the transmission based upon a minimum of the compared commanded variable gear ratio and the operator requested gear ratio. The method, by enforcing a limit on commanded transmission output speed, ensures that the target gear ratio provided to a controller for the transmission does not exceed the maximum commanded variable gear ratio for a current determined value for the downhill slope value in the machine direction of travel.

The disclosure describes, in a second aspect, a programmed controller configured with a non-transitory computer-readable medium including computer-executable instructions for managing operation of a machine to prevent movable machine components from reaching excessive speed while the machine is traveling down a steep incline. The computer-executable instructions executed by the programmed controller facilitate performing a method including determining a downhill slope value in a machine direction of travel, and then establishing a maximum commanded transmission output speed in accordance with the determined downhill slope value. The method further includes establishing a maximum commanded gear ratio, for a transmission having a variable gear ratio, based upon the maximum commanded transmission output speed and a current engine speed, and then comparing the maximum commanded variable gear ratio to an operator requested gear ratio. The method furthermore includes establishing a target gear ratio for the variable gear ratio of the transmission based upon a minimum of the compared commanded variable gear ratio and the operator requested gear ratio. The method, by enforcing a limit on commanded transmission output speed, ensures that the target gear ratio provided to a controller for the transmission does not exceed the maximum commanded variable gear ratio for a current determined value for the downhill slope value in the machine direction of travel.

The disclosure describes, in a third aspect, a machine including a traction drive, an engine, and a transmission providing power from the engine to the fraction drive, the transmission having a variable gear ratio. The machine furthermore includes a programmed controller configured with a non-transitory computer-readable medium including computer-executable instructions for managing operation of a machine to prevent movable machine components from reaching excessive speed while the machine is traveling down a steep incline. The computer-executable instructions executed by the programmed controller facilitate performing a method including determining a downhill slope value in a machine direction of travel, and then establishing a maximum commanded transmission output speed in accordance with the determined downhill slope value. The method further includes establishing a maximum commanded gear ratio, for a transmission having a variable gear ratio, based upon the maximum commanded transmission output speed and a current engine speed, and then comparing the maximum commanded variable gear ratio to an operator requested gear ratio. The method furthermore includes establishing a target gear ratio for the variable gear ratio of the transmission based upon a minimum of the compared commanded variable gear ratio and the operator requested gear ratio. The method, by enforcing a limit on commanded transmission output speed, ensures that the target gear ratio provided to a controller for the transmission does not exceed the maximum commanded variable gear ratio for a current determined value for the downhill slope value in the machine direction of travel.

Other aspects of the invention will become apparent in view of the disclosure provided herein.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE DRAWINGS

Figure 1:
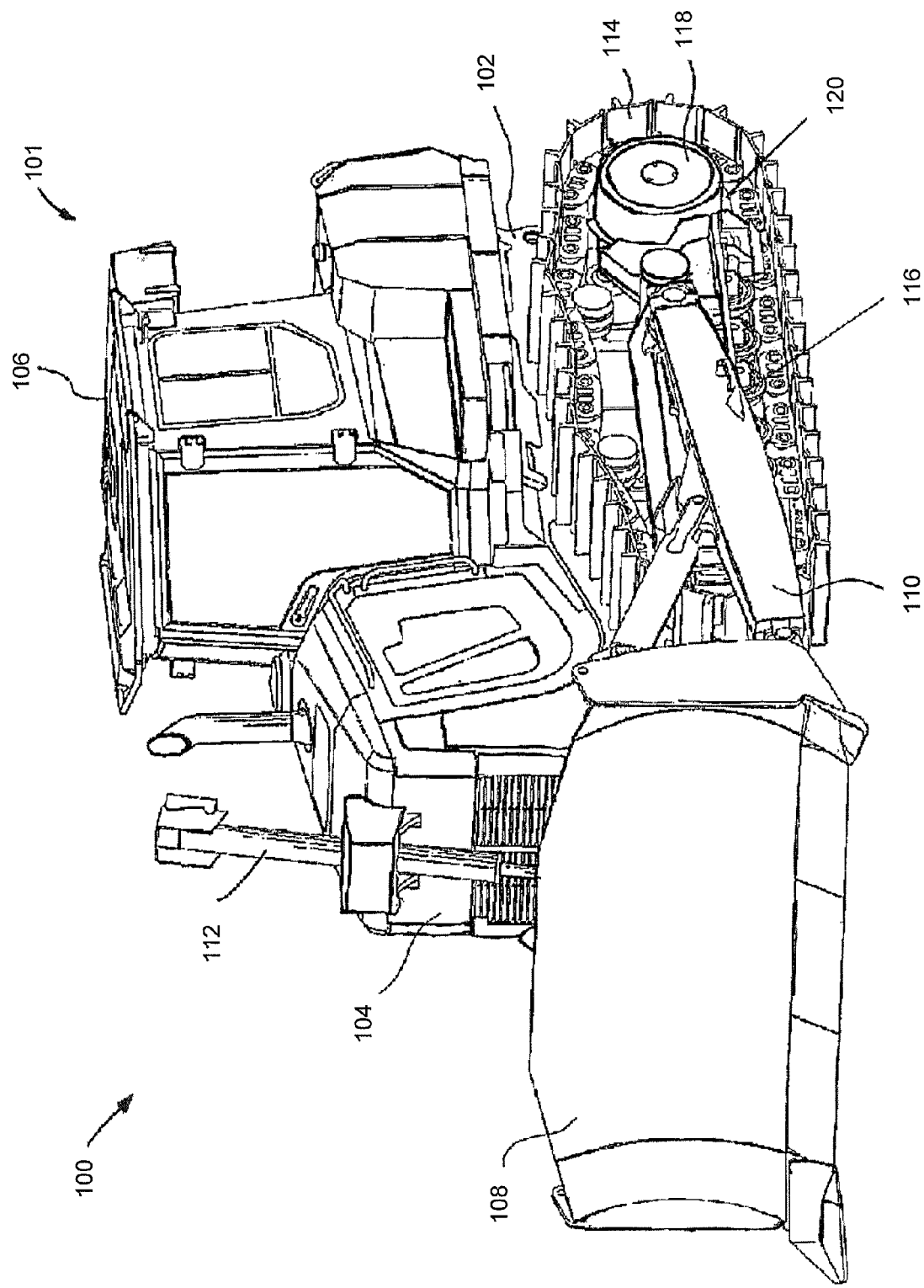
FIG. 1 is an outline perspective view of a continuous track-type machine, which is illustrated as one example of a machine in accordance with the disclosure.

Attention is directed to FIG. 1 that provides an outline perspective view of one example of a machine 100 that may incorporate an open loop downhill machine speed limiting control scheme. In the illustration of FIG. 1, the machine 100 is a continuous track tractor 101, which is used as one example for a machine to illustrate the above-summarized machine speed limiting scheme utilizing a variable transmission. While the arrangement is illustrated in connection with the continuous track tractor 101, the arrangement described herein has potential applicability in various other types of machines including a variable transmission, such as wheel propelled machines (e.g., wheel loaders) that travel upon a variety of slopes. The term traction drive refers to the interface between the machine and the ground, examples of which include a tractor track and a wheel. The term "machine" refers to any machine that performs some type of operation associated with an industry such as mining, construction, farming, transportation, or any other industry known in the art. For example, the machine may be an earth-moving machine, such as an excavator. Other, non-track machines include a dump truck, backhoe, motor grader, material handler or the like. Other examples of the machine 100 include over-road vehicles.

In the illustrated embodiment, the machine 100 may include a frame 102 supporting an engine 104. In the illustrated embodiment, the engine 104 may be an internal combustion engine providing power to various machine systems in the form of a torque output. Operation of the machine 100 may be controlled, in part, by an operator. A blade 108 may be connected via linkages 110 to the frame 102, and an actuator 112 may interconnect the blade 108 to the frame 102 at a selectable position or height. The actuator 112 in the illustrated embodiment is a hydraulic cylinder.

The machine 100 may include ground engaging members, which are illustrated as two continuous tracks 114 (only one being visible) as one example, but other types may be used. In the illustrated embodiment, the two continuous tracks 114 are associated with a series of idle rollers 116 and may be driven by two hydraulic motors (not shown) connected to final drives (sprockets) 118 (only one visible). In an alternative embodiment, electric motors are provided in place of the hydraulic motors. In both the electric and hydraulic motor arrangements, the motors are powered by the rotational output of the engine 104. However, differing models will be used to relate slope to maximum commanded machine speed due to differing mechanical characteristics of electric and hydraulic motors/drives.

Figure 2:
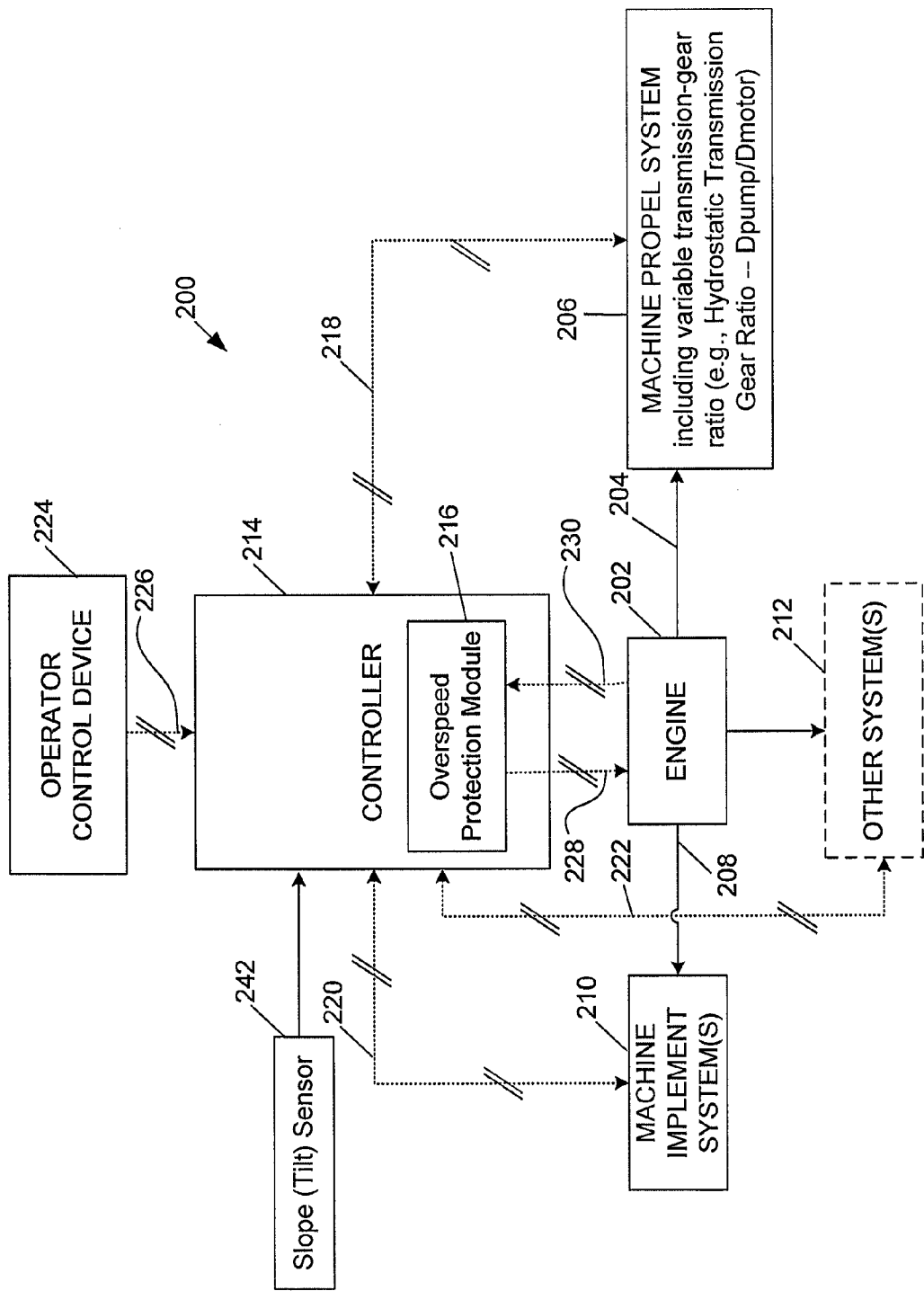
FIG. 2 is a block diagram representation of the engine, propel system (e.g., hydraulic motor, sensors and a programmed controller (including slope estimate and overspeed control module) of an exemplary machine in accordance with the disclosure.

A simplified block diagram of a power system 200 for a machine, for example, the machine 100 (FIG. 1), is shown in FIG. 2. The power system 200 may include a prime mover or, as illustrated, an engine 202. The engine 202 is arranged to provide power to various machine systems during operation. Such systems are used to propel or otherwise move the machine, and/or provide a machine function. In the illustrative example, the engine 202 provides power, via a propel power 204 output to one or more systems that operate to move the machine, which is/are shown collectively as a machine propel system 206.

The machine propel system 206 may include one or more types of motive force generation for the machine 100, such as hydraulic, electrical, mechanical, pneumatic, etc. The propel power 204 is provided in any suitable form including, for example, as mechanical power from a rotating shaft, electrical power, etc. The machine propel system 206 may include one or more motors (not shown) that are arranged to rotate or otherwise actuate components providing force for driving, for example, the two continuous tracks 114 of the machine 100.

In accordance with an illustrative example summarized above, the machine propel system 206 may comprise a variable transmission. Moreover, the variable transmission may be a continuously variable transmission (CVT) such as one provided for a hydrostatic drive system. In such case, the continuously variable transmission ratio corresponds to a ratio of the pump displacement over motor displacement. A CVT ratio for such a system is increased by increasing the relative value of pump displacement to motor displacement by modifying displacement of one or both of the pump and motor. Operation of hydrostatic CVTs is well known and thus will not be described in detail herein.

In addition to the propel power 204, the engine 202 provides an implement power 208 to one or more implements of the machine 100, which is/are collectively illustrated as machine implement system(s) 210. The machine implement system 210 may include any known type of actuator using a power input to perform a function. Such power input is converted, for example, into mechanical power that operates a machine implement. With reference to FIG. 1, for example, the implement power 208 is provided in the form of mechanical power operating a hydraulic pump (not shown) providing a flow of pressurized fluid to cause movement of the actuator 112.

The engine 202 may also provide power to operate other systems, which are collectively denoted by 212 in FIG. 2. Such other systems may include fans, blowers, air-conditioning compressors, lights, electronic systems, and/or other machine systems.

In the illustrative embodiment, the power system 200 may include a programmed controller 214. The programmed controller 214 is, for example, a single controller or alternatively may include more than one controller disposed to control various functions and/or features of the machine 100. The programmed controller 214, by way of example, may include an overspeed protection module 216. The overspeed protection module 216, comprises computer-executable instructions that facilitate creating, updating and using a stored model (see FIGS. 3 and 4) specifying a maximum commanded machine/motor speed while the machine 100 is traveling on a downhill slope. Both machine speed and motor speed are specific examples of a speed that is generally referred to herein as "transmission output speed" to account for various alternative drive mechanisms and points of reference when specifying a limit, a target, or a current value for a moving part of a machine.

In the illustrated embodiment, the power system 200 may include various links disposed to exchange information and command signals between the programmed controller 214 and the various systems of the machine 100. Such links are of any appropriate type, and may be capable of two-way exchange of multiple signals. In one embodiment, such links are channels of communication between various devices that are connected to one another via a controller area network (CAN). More specifically, a propel communication link 218 interconnects the programmed controller 214 with the machine propel system 206. The propel communication link 218 provides propel commands and settings to the machine propel system 206, such as an operator-based command to propel the machine 100, which may include an actuation signal for one or more drive system members and/or to specify a target gear ratio for the variable transmission. The propel communication link 218 also provides information about the machine propel system 206 to the programmed controller 214. Such information may include the speed of operation of the one or more (hydraulic) motors, and so forth.

In a similar fashion, an implement communication link 220 interconnects the programmed controller 214 with the machine implement system 210. The implement communication link 220 provides command signals to operate the various implements associated with the machine implement system 210, as well as to provide information about the operation of the various implements, such as torque or power utilization, to the programmed controller 214. In one embodiment, various other components and systems 212 of the machine are interconnected with the programmed controller 214 via other, respective communication links, which are collectively denoted by reference numeral 222 in FIG. 2. Such other communication links are capable of two-way communication of information and other signals between the programmed controller 214 and the various other components and systems 212 of the machine 100.

An actual current slope of the machine 100 may be obtained directly from a signal provided by a slope sensor 242. The slope sensor 242 specifies the grade upon which the machine is traveling (in a forward direction). In accordance with an exemplary embodiment, a slope estimate is calculated indirectly from machine operation variables as opposed to direct measurements provided by the slope sensor 242. This alternative is described herein below.

The programmed controller 214 may be communicatively connected to the engine 202 by two communication links, an engine output link 228 and an engine input link 230. The engine output link 228 represents the ability of the programmed controller 214 to provide command signals to various engine actuators and systems that control the operation of the engine 202. As is known, the programmed controller 214 can control engine speed and power (when driving against a load) by, for example, controlling the amount of fuel and/or air that enters the engine 202. Such engine control is typically based on various engine operating parameters, such as engine speed which is used in an overspeed control method summarized herein below that modifies a variable transmission gear ratio to control (limit) machine speed (and indirectly, the speed of other rotating components such as the engine) of the machine 100 during downhill travel. Information signals that are indicative of one or more engine operating parameters are provided to the programmed controller 214 via the engine input link 230. As discussed above, the engine input link 230 and the engine output link 228 are embodied in any appropriate arrangement, for example, by use of CAN links that are capable of transferring more than one signal at the same time, but other arrangements may be used.

It will be appreciated that the programmed controller 214 discussed herein is a computing device, e.g., a processor, which reads computer-executable instructions from a computer-readable medium and executes those instructions. Media that are readable by a computer include both non-transitory and transitory media. Examples of the former include magnetic discs, optical discs, flash memory, RAM, ROM, tapes, cards, etc. Examples of the latter include acoustic signals, electrical signals, AM and FM waves, etc. As used in the appended claims, the term "non-transitory computer-readable medium" denotes tangible media that are readable by a computer unless otherwise specifically noted in the claim.

Figure 3:
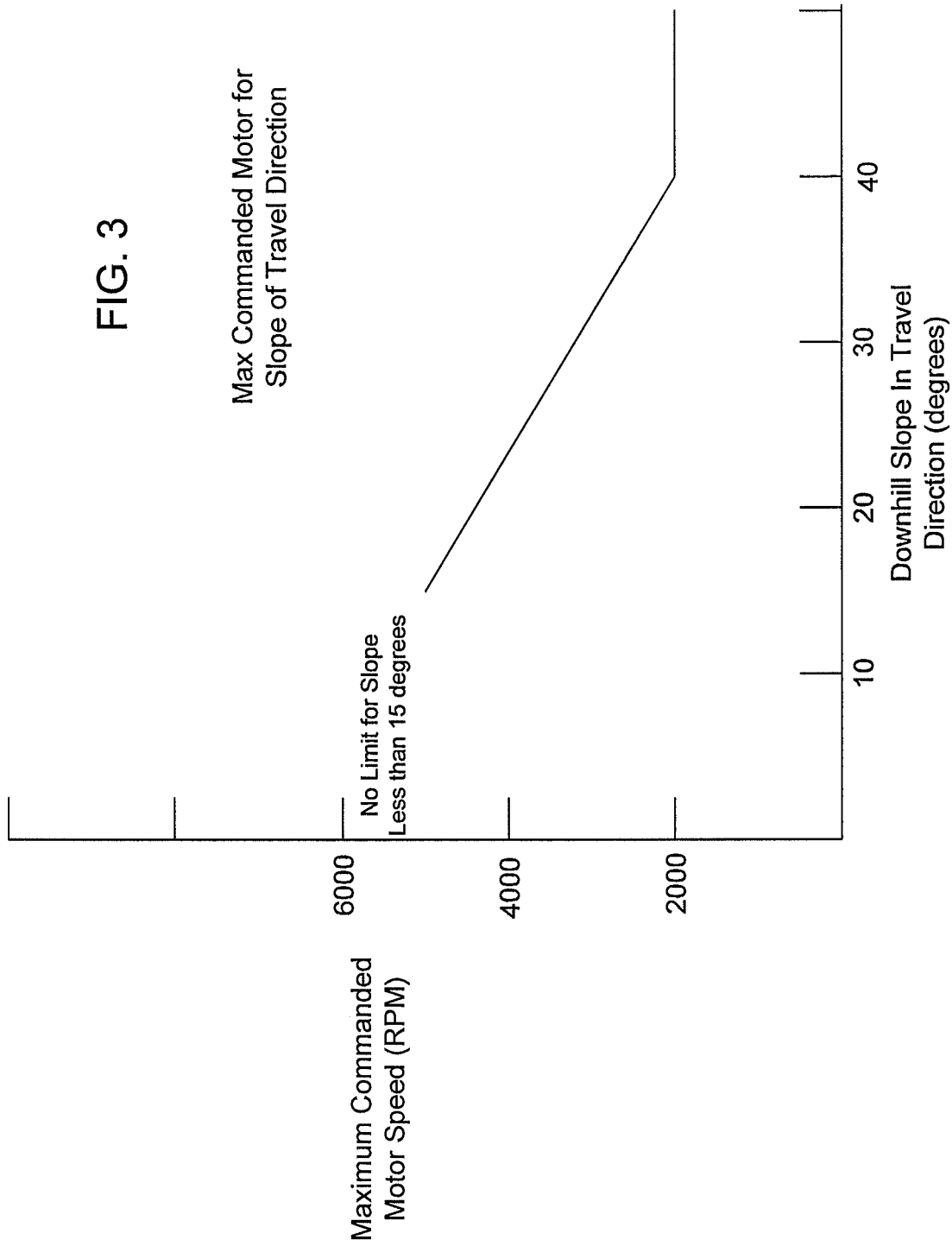
FIG. 3 is an exemplary model used to determine a maximum commanded motor speed based upon a determined slope in a direction of travel of the machine in accordance with the disclosure.

Having described an exemplary machine and power control arrangement (FIG. 2), attention is now directed to FIG. 3 that illustratively depicts an exemplary maximum commanded motor speed model maintained by the overspeed protection module 216 of the programmed controller 214 to limit/override an operator command for increased machine speed while the machine 100 is traveling downhill on a slope exceeding a threshold grade. In the illustrative example, the maximum commanded motor speed model is represented by a two-dimensional graph. A vertical axis specifies maximum commanded motor speed, and a horizontal axis specifies a slope (either measured or estimated). By way of example the values for the maximum commanded motor speed model are determined, as a function of downhill slope either empirically (physical tests of the machine 100 on various slope angles) or alternatively through simulation. Thereafter, the model incorporating slope values and corresponding maximum commanded motor speeds is stored in any of a variety of ways including a look up table, a characterizing equation, a set of characterizing equations (covering specified slope ranges), etc.

Where S is a current downhill slope angle/grade upon which the machine 100 is traveling. As noted above, the value of S may be determined by direct measurement or calculated from various dynamic mechanical values observed during operation of the machine 100 on a slope. Moreover, the value of maximum commanded motor speed may be based upon additional observed parameters including: an operational mode, a current implement load (e.g. a deployed shovel or grader blade), etc. Such variations in operational modes may be accommodated by maintaining a set of selectable operational mode-specific models. Such model selection can occur either semi-automatically (in response to an operator-designated operation mode) or automatically based upon a combination of sensed parameter values indicative of a current operating mode.

In general, the maximum commanded motor speed model depicted in FIG. 3 identifies a relationship characterized by reducing maximum commanded motor speed with increasing downhill slope in the direction of machine travel. In operation, a motor speed limit is designated for use by the programmed controller 214. In the example provided in FIG. 3, the maximum commanded motor speed is set at a maximum (5000 RPM) for all downhill slopes that are less than a threshold slope value (e.g. 15 degrees). However, as the slope increases, as shown in FIG. 3 a decreasing maximum commanded motor speed is specified for downhill travel slopes exceeding the threshold slope value. A maximum commanded motor speed of 2000 RPM is specified for the machine 100 when traveling on a slope of 40 degrees or more. It is noted that the maximum commanded motor speed is never compared to an actual measured motor speed. Instead, the maximum commanded motor speed is used to derive a commanded transmission gear ratio (e.g. pump displacement divided by motor displacement in a hydraulic motor driven machine) which is approximately proportional to the commanded motor speed divided by the current engine speed. In this regard, an open loop machine speed control scheme is presented with long term maximum commanded motor speed model tuning as well as operation mode-specific selection of a model from a set of pre-configured models.

Figure 4:
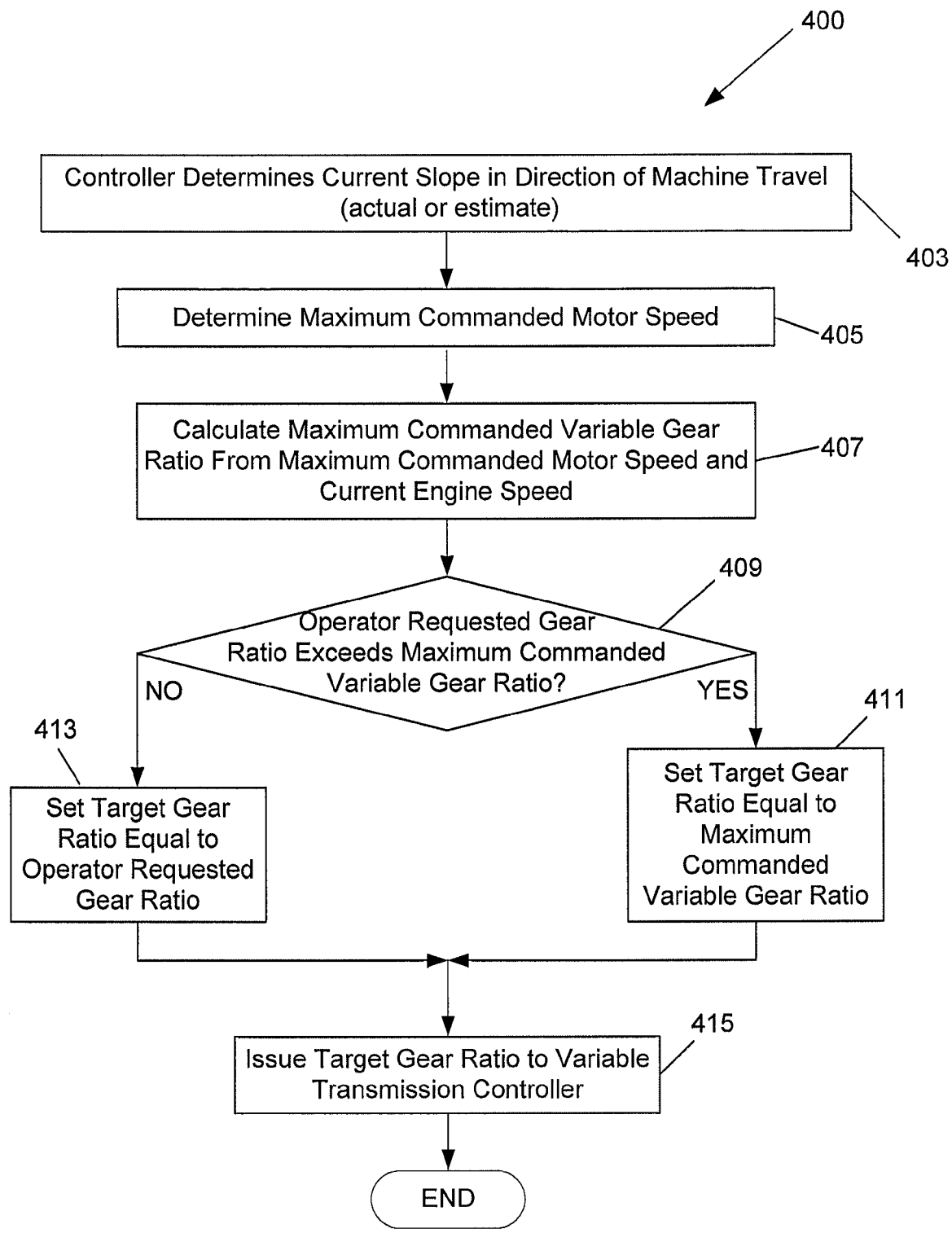
FIG. 4 is a flowchart summarizing operation of an exemplary process carried out by a controller to determine/apply a maximum commanded variable gear ratio based upon a current slope and engine speed in accordance with the disclosure.

FIG. 4 summarizes a set of steps for a process 400, carried out by the machine 100 under the direction of the programmed controller 214 configured with the overspeed protection module 216. The summarized steps relate to use, by the overspeed protection module 216, of the maximum commanded motor speed model (see FIG. 3), to limit a maximum commanded motor speed during downhill travel. The process 400 is exemplary. Thus, variations are contemplated for controlling the maximum commanded motor speed to prevent damage to machine moving parts such as hydraulic motor and hydraulic pump components of a hydrostatic transmission of the machine propel system 201 in the machine 100. It is noted that prior to operation of the process 400, the maximum commanded motor speed model (see e.g., FIG. 3) is stored in the overspeed protection module 216. By way of example, the maximum commanded motor speed model is created by running the machine 100 down a known set of slopes (or simulating this process) and experimentally determining a set of maximum commanded speeds for various exemplary grades to generate a characterizing relationship between maximum commanded motor speed and measured or estimated (effective) slope.

During step 403, the programmed controller 214 determines a current slope value in the machine direction of travel. The current slope value may be an actual value provided by an incline meter. A slope signal is provided, for example, by the slope sensor 242 to facilitate calculating a current normal force for the machine 100. However, in accordance with an illustrative example described herein below (see FIGS. 5a, 5b, 5c, 5d, 5e and 5f discussed herein below), the slope value in a machine direction of travel is an estimated (effective) slope value derived from a combination of static and dynamic machine parameters. The estimated (effective) slope value may provide better performance in the machine/motor speed limiting method described herein since the actual slope value does not take into consideration variations in resistance to travel of the machine 100 arising from carrying a heavy load or resistance to travel arising from a deployed blade, shovel or other implement.

During step 405 the programmed controller 214 overspeed protection module 216 applies the current slope to the maximum commanded motor speed model (see FIG. 3) to determine a maximum commanded motor speed corresponding to the current slope. It is noted that the maximum commanded motor speed can be represented in a variety of ways. For example, in the case where the ground speed of a machine is directly proportional to the motor speed, the motor speed model depicted in FIG. 3 also represents the maximum commanded ground speed to slope relationship of the machine 100. Such is the case with a hydrostatic drive machine (e.g., a dual-path tractor) having a fixed gear connection to the tractor sprocket driving a track.

Thereafter, during step 407 the programmed controller 214 calculates a maximum commanded variable gear ratio based upon the maximum commanded motor speed (from step 405) and a current engine speed. By way of example, the maximum variable gear ratio is obtained by dividing the maximum commanded motor speed by the current engine speed. The calculated value may be multiplied by constant to render the maximum commanded variable gear ratio. Such would be the case, for example, where the maximum commanded motor speed is represented by maximum commanded ground speed.

Next, during step 409, if an operator requested gear ratio (machine speed request) exceeds the maximum commanded variable gear ratio determined during step 407, then control passes to step 411. During step 411, the programmed controller 214 overrides the operator requested gear ratio by setting the target gear ratio at the maximum commanded variable gear ratio derived from the modeled limit set forth, by example, in FIG. 3.

If, at step 409, the programmed controller 214 determines that the operator requested gear ratio does not exceed the maximum commanded variable gear ratio, then control passes from step 409 to step 413. During step 413, the programmed controller sets the target gear ratio at the level requested by the operator since the operator is not requesting a machine speed that exceeds the modeled limit set forth, by example, in FIG. 3.

During step 415, the programmed controller issues the target gear ratio to a controller for the variable transmission within the machine propel system 206. By way of example, the programmed controller 214 issues a signal to the machine propel system 206 to reduce the variable gear ratio of the hydrostatic transmission by increasing a displacement of the hydraulic motor in relation to a hydraulic pump displacement (i.e., reduce a hydrostatic transmission ratio of a hydraulic CVT). The gear ratio reduction causes a short term increase in the engine speed (driving the hydraulic pump), but the increased resistance arising from the increased engine speed ensures that the motor speed will decrease in the long term, achieving the desired steady-state condition in a stable manner. Control then passes to the End.

The process summarized in FIG. 4 is performed continuously during operation of the machine 100 to prevent excessive operating speed conditions for machine components, such as an engine due to operation of the machine 100 in a downhill direction on a slope. It is noted that generating the various parameters used to determine whether a maximum commanded motor speed has been exceeded (during step 409) can occur at any time, and the programmed controller 214 uses the currently available values for the relevant parameters used to determine whether the maximum commanded motor speed has been exceeded. Thus, the order of the steps shown in FIG. 4 can be re-arranged (and some steps may even be skipped) without notable effect upon the operation of the system as long as step 409 is executed relatively frequently.

Determining the current slope in the machine direction of travel through estimation based upon machine operating parameters, as opposed to direct measurement of an incline upon which the machine 100 travels, may be used to acquire the slope value during step 403. In this regard, attention is directed to FIG. 5a that depicts a diagram of a tractor 500 traveling on a slope having an incline angle THETA (Θ). A set of forces, including gravity creating an acceleration (g) force operating upon the tractor 500 having a mass M, are also depicted. A gravitational force tends to pull the tractor 500 downhill. A resistive force arising from moving machine parts and components tends to resist the downhill force of gravity. When the two forces are in equilibrium, the tractor 500 maintains a steady speed.

Figure 5A:
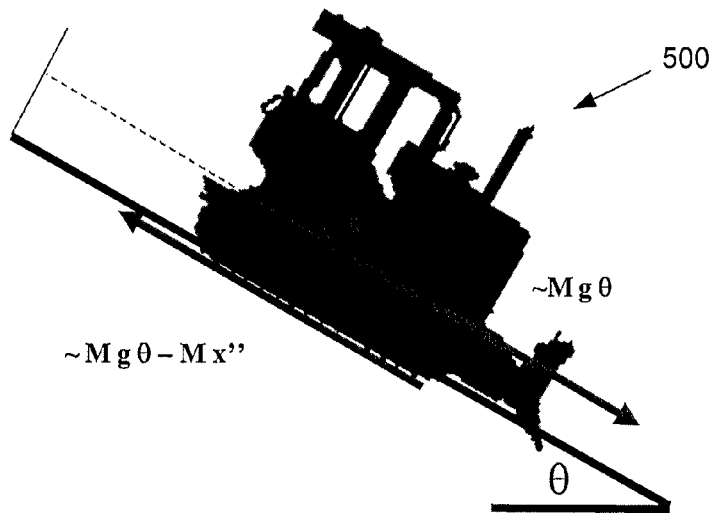
FIG. 5a illustratively depicts a diagram of a tractor traveling on a slope having an incline angle THETA ($\Theta$)
Figure 5B:
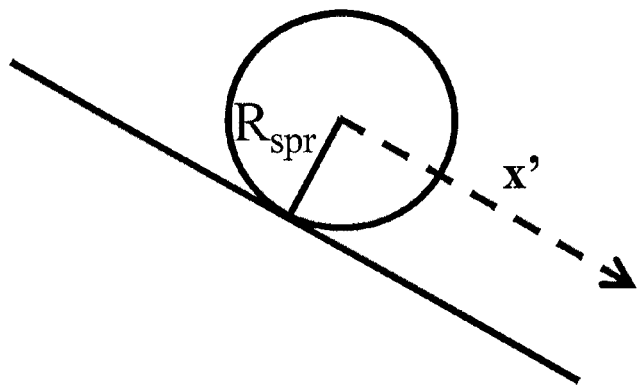
FIG. 5b illustratively depicts a free body diagram of the forces acting upon the tractor traveling down the slope.

FIG. 5b depicts a rolling sprocket having a linear velocity (x') that is proportional to the sprocket radius (referred to variously as Rspr, Rs, and R herein) times the rotational speed of the sprocket ($\omega_{spr}$) of the track drive of the tractor 500. This product value, in turn is approximately equal to:

(Rspr)($\omega_e$)(Dp/Dm)/$GR_{fd}$ $\omega_e$ equals the engine speed,

Dp/Dm equals the hydrostatic gear (displacement) ratio (also referred to herein below as "GR"), $GR_{fd}$ equals the gear ratio of the final drive connected to the sprocket for the tractor drive.

Figure 5C:
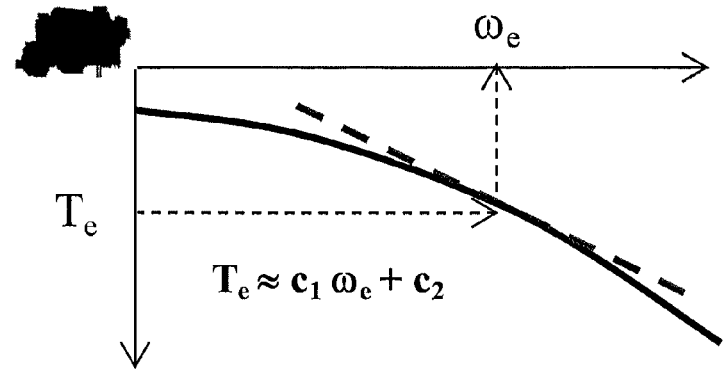
FIG. 5c illustratively depicts a relationship between engine speed and an engine braking torque (Te) developed by the rotating engine.

FIG. 5c illustratively depicts a relationship between engine speed and an engine braking torque (Te) developed by the rotating engine—a value that increases in magnitude with increased engine speed. The engine braking torque (Te) is approximated by a linear equation including a constant term (c1) and a variable term (c2 time engine speed). Thus the engine braking torque (Te) is approximated an equation providing a value that increases linearly with engine speed.

Figure 5D:
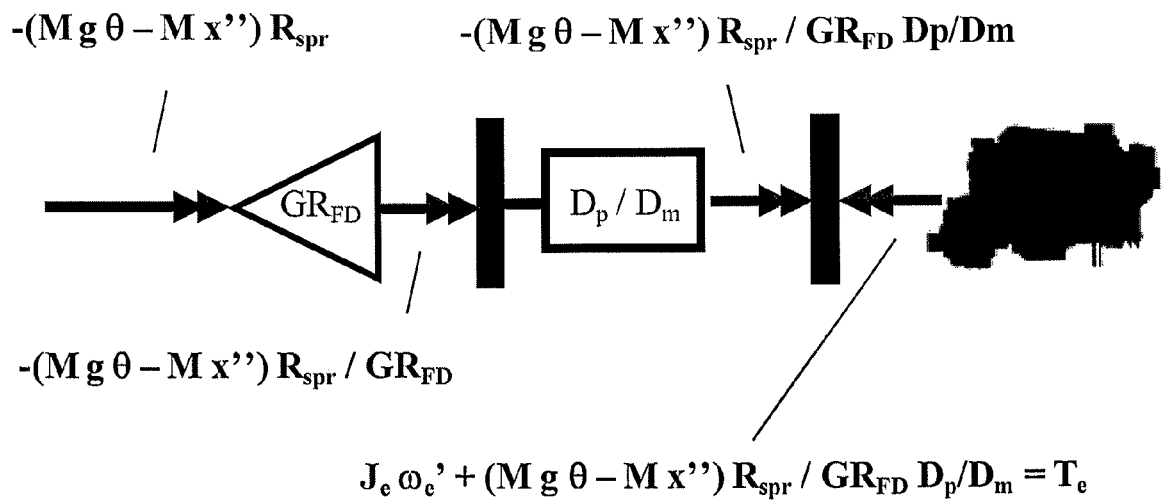
FIG. 5d illustratively depicts physical (force) linkages between the sprocket driving a tractor track, the final drive gear ($GR_{FD}$), the hydrostatic transmission (Dp/Dm), and the engine in accordance with the disclosure.

FIG. 5d illustratively depicts physical (force) linkages between the sprocket driving a tractor track, the final drive gear ($GR_{fd}$), the hydrostatic transmission (Dp/Dm), and the engine. Force expressions, corresponding to the (summed) forces observed at the particular physical linkage, are displayed in FIG. 5d for each respective physical linkage. Thus, as another physical linkage is added to the model for the observed force between the ground and a linkage of interest, the expression for the observed force at the linkage increases in complexity. Thus, the simplest expression is on the left side of FIG. 5d (force observed at the final drive sprocket). At the final drive gear a term is added to account for the gear ratio of the final drive. At the hydrostatic transmission interface a further term is added to account for the hydrostatic transmission gear ratio. At the engine flywheel interface, a term is added to account for engine flywheel inertial forces (dependent upon the rotation speed of the engine flywheel. In the expressions, in addition to the previously defined parameters, $J_e$ is the mass moment of inertia of the engine (and flywheel), and x" is the linear acceleration (i.e., second derivative of position x) of the machine.

Figure 5E:
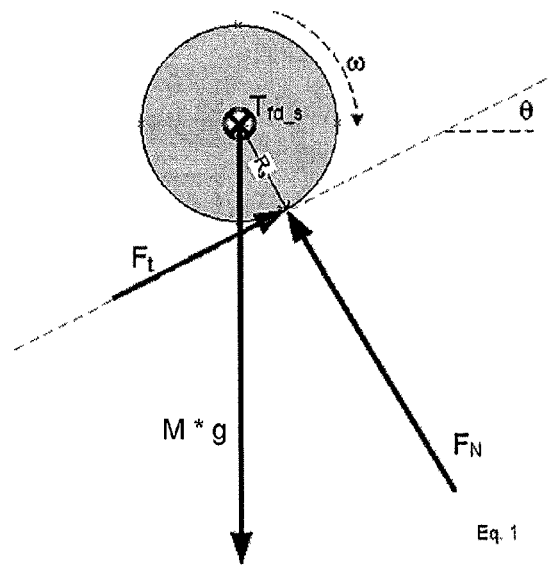
FIG. 5e illustratively depicts a force diagram, from the perspective of the final drive to which the drive sprocket for a track of the tractor is attached.

FIG. 5e depicts a force diagram, from the perspective of the final drive to which the drive sprocket for a track of the tractor 500 is attached, used to model the tractor 500 traveling down an incline having a slope THETA (Θ).

Figure 5F:
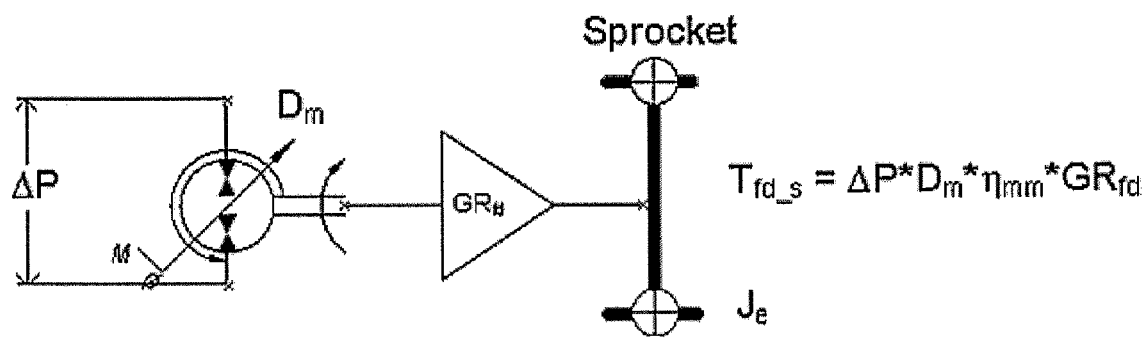
FIG. 5f illustratively depicts a model for the operation of the tractor traveling down an incline having the slope THETA ($\Theta$).

FIG. 5f depicts a model for the operation of the tractor 500 traveling down an incline having the slope THETA (Θ). In this particular case, a differential pressure ΔP (delta P) across a hydraulic motor (provided by a sensor to the programmed controller 214) is incorporated into the force determination in accordance with the diagram in depicting the relationships between the sprocket, final drive, and hydraulic motor. The model depicted in FIG. 5f introduces the further parameter $\eta_{mm}$ that specifies the motor mechanical efficiency (e.g. ninety percent).

In the case where the differential pressure across the motor, the motor displacement, and motor speed (which can potentially change) are known/measured, an estimated slope THETA (Θ) is found according to the following equation:

$$\theta := \frac{2 \cdot R_s}{g \cdot GR_{fd}} \cdot \frac{d}{dt}\omega_m \cdot \text{sign}(\omega_m) - \frac{GR_{fd}}{\text{mass} \cdot g \cdot R_s} \cdot \Delta P \cdot D_m \cdot \text{sign}(\omega_m) \cdot \eta_{mm}^{\text{sign}(\Delta P) \cdot \text{sign}(\omega_m)}$$

where: "sign" indicates the direction of pressure across the hydraulic motor and direction of motor rotation (taking into consideration whether the tractor 500 is backing downhill instead of traveling in a forward direction). The remaining parameter values have been previously discussed above and will not be repeated here. The equation presented above is for a certain machine configuration (in this case a single hydraulic pump and motor configuration), after making appropriate approximations and neglecting minor terms (not contributing substantially to the final determination of slope).

If the differential pressure across the hydraulic motor is not known, then the downhill slope estimate can be obtained from the following equation derived, from forces observed at the engine flywheel interface (see FIG. 5d) to the hydrostatic transmission's hydraulic pump, according to the following equation:

$$\left(J_e + \frac{M \cdot R^2}{GR_{fd}^2} \cdot GR^2\right) \cdot \frac{d}{dt}\omega_e + \left(\frac{M \cdot R^2}{GR_{fd}^2} \cdot GR \cdot \frac{d}{dt}GR + C_l\right) \cdot \omega_e = \frac{M \cdot g \cdot R}{GR_{fd}} \cdot GR \cdot \theta - C_2$$

Solving for slope (THETA) renders the following equation for a slope estimate that does not rely upon determining the differential pressure across the hydraulic motor of the hydrostatic transmission of the tractor 500.

$$\theta = \left(\frac{J_e \cdot GR_{fd}}{M \cdot g \cdot R \cdot GR} + \frac{R \cdot GR}{g \cdot GR_{fd}}\right) \cdot \frac{d}{dt}\omega_e + \left(\frac{R \cdot \frac{d}{dt}GR}{g \cdot GR_{fd}} + \frac{C_l \cdot GR_{fd}}{M \cdot g \cdot R \cdot GR}\right) \cdot \omega_e + \frac{C_2 \cdot GR_{fd}}{M \cdot g \cdot R \cdot GR}$$

Thus, a current value for the slope (estimate) can be easily determined based upon readily available machine parameter values while observing the change in engine speed while traveling on a slope having an angle THETA.

The illustrative control process described herein above with reference to FIG. 4 can be modified and/or enhanced through use of additional and/or alternative input data and models. For example, rather than having a single model (e.g., lookup table) for the machine 100's operation, the mapping depicted in the model depicted in FIG. 3 is established multiple times. Each model generated for use by the programmed controller 214 is identified by a descriptive term representative of a mode of operation (e.g., loaded, unloaded, etc.) and/or surface traveled by the machine 100 while a particular one of the multiple machine speed limitation models is generated. Such configuration is performed potentially multiple times to account for various ground/surface conditions and operating modes (deployed blade, loaded hauler, etc.) influencing the model summarized, for example, in FIG. 3. The set of stored models is extensible. Thus, an operator of the machine 100 can designate a new model (e.g., characteristic equation) to be generated from sufficient data points for a curve fitting program to operate.

INDUSTRIAL APPLICABILITY

This disclosure relates to machine propulsion systems and methods of operation that incorporate a programmed controller to facilitate managing (e.g., limiting to an acceptable range) downhill machine speed on a variety of machines, such as dual-path tractors, off-road trucks, and over-road vehicles. Such machines preferably, but not necessarily, have a variable (preferably continuously variable) transmission gear ratio. Moreover, determining a maximum commanded machine speed limit is carried out in accordance with a currently determined downhill slope in a machine direction of travel. Once a maximum commanded machine speed limit is determined, the programmed controller specifies a variable transmission gear ratio to achieve a target gear ratio enabling operation of the machine at a speed that will not exceed the maximum commanded machine speed limit. The commanded machine speed limit may be chosen in order to limit some aspect of a component of the machine not directly proportional to machine speed (such as to limit engine speed, or pump flow, as examples).

The disclosed system and method facilitate limiting downhill speed and directly or indirectly related dynamic characteristics of a machine by use of moving parts of a machine drive train (e.g. engine, hydraulic pump, and hydraulic motor) to balance forces tending to accelerate the downhill travel speed of the machine. In the case of dual-path tractors that do not have friction brakes, forces arising from control of machine engine and drive train components (e.g., hydraulic motor displacement, hydraulic pump displacement) are relied upon when the tractor travels down a steep slope where static resistance forces to forward movement do not exceed gravity-induced forces in a direction of downhill travel of the tractor.

In such case, the gravitational forces acting on the hydrostatic drive system and engine of the dual-path tractor deliver net power through a hydraulic pump/motor combination. The hydraulic pump/motor combination, in turn, drives the engine. An equilibrium point is reached where the sum of the resistive forces exerted by the engine and the subsystems it drives, such as implements (that increases with increased engine speed) equals that delivered from the portion of machine weight vector in the direction of travel (which increases with increased slope) through the hydraulic pump/motor combination. For a given slope, the equilibrium point (that is not necessarily or even likely reached due to the dynamic nature of various conditions under which the machine can travel downhill), where the engine speed stabilizes, depends upon a hydrostatic transmission gear ratio (corresponding to the ratio of the hydraulic pump displacement over the hydraulic motor displacement). For a lower gear ratio, a higher engine speed is present for a given machine speed. Thus, a machine's maximum speed in a direction of travel for a given slope can be controlled by selecting a particular hydraulic gear ratio for a given engine speed.

Moreover, an open-loop machine speed control scheme is described herein that does not rely in any way upon determining an actual machine speed. Instead, a maximum commanded motor speed is determined by the programmed controller based upon a currently determined downhill slope in a machine direction of travel. A maximum commanded variable gear ratio is determined by dividing the maximum commanded motor speed by the current engine speed. An actual machine speed has no impact upon determining the maximum commanded variable gear ratio.

Furthermore, with regard to maintaining a model (e.g., a look up table, a characterizing equation etc.) relating slope to a maximum commanded motor speed, the programmed controller is configured to select from potentially many different models relating the slope to a maximum commanded motor speed based upon operator preference (e.g. conservative-lower speed limit) and/or particular operating conditions (e.g. pavement, softened soil, earth moving implement deployed, loaded trailer etc.). The model, in general, is intended to specify a maximum groundspeed wherein resistive forces generated by engine and its driven components effectively counter gravitational forces tending to accelerate the machine traveling downhill.

The maximum commanded machine speed for a given slope that defines open-loop operation of the described engine overspeed prevention scheme may be adjusted, on a long term basis, by tuning the slope-based maximum commanded motor speed model based upon a variety of operational feedback observed by an operator or a supervisory process running on the machine's electronic control module. Such feedback can be provided by actual operator observations (e.g. an earth hauling machine operating under heavy load conditions) and by observing resulting ground/motor speed.

Regarding using the model (e.g., a look up table with entries indexed according to sensed slope) to limit maximum commanded machine speed, during operation of the machine, the programmed controller limits, and reduces if necessary, a target gear ratio for a variable transmission (e.g. a ratio of pump displacement and motor displacement) for a current engine speed based upon a currently determined slope. The maximum commanded motor speed is based upon a current configuration of the model relating slope of travel to a maximum commanded motor speed for the machine. Thus, in response to a determination of travel down an excessive slope (i.e. triggering of the control described herein), the programmed controller in a hydraulic motor-driven machine limits a maximum commanded motor speed by specifying a maximum commanded variable gear ratio, corresponding to a ratio of pump and motor displacements, at a current engine speed. Thus, in a particular example, a specified reduced transmission gear ratio is achieved by reducing a hydrostatic (CVT) ratio. Reducing the hydrostatic CVT ratio by, for example, increasing the hydraulic motor displacement in relation to the hydraulic pump displacement has the effect of increasing the resistance force generated by the machine's engine and its driven components at a given machine speed.

It will be appreciated that the disclosed machines and programmed controller process for such machines are used in other contexts as well, and the teachings are likewise broadly applicable. Using the disclosed principles, the programmed controller 214 prevents machine overspeed conditions by limiting, and if necessary reducing, a commanded motor speed by reducing a commanded variable gear ratio. It will be appreciated that this description provides examples of the disclosed system and technique. However, it is contemplated that other implementations of the disclosure may differ in detail from the foregoing examples. Moreover, the references to examples herein are intended to reference the particular example being discussed at that point and are not intended to imply any limitation as to the scope of the disclosure more generally. All language of distinction and disparagement with respect to various features is intended to indicate a lack of preference for those features, but not to exclude such from the scope of the disclosure entirely unless otherwise indicated. Although the engine 202 is typically an internal combustion engine, other engines/motors are contemplated for use in the machine 100 without departing from the scope of the disclosed principles.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order and from any suitable step unless otherwise indicated herein or otherwise clearly contradicted by context.

What is claimed is:

1. A method, carried out by a programmed controller configured with a non-transitory computer-readable medium including computer-executable instructions, of managing operation of a machine to prevent movable machine components from reaching excessive speed while the machine is traveling down a steep incline, the method comprising:
   determining a downhill slope value in a machine direction of travel;
   establishing a maximum commanded transmission output speed in accordance with the determined downhill slope value;
   establishing a maximum commanded gear ratio, for a transmission having a variable gear ratio, based upon the maximum commanded transmission output speed and a current engine speed;
   comparing the maximum commanded variable gear ratio to an operator requested gear ratio;
   establishing a target gear ratio for the variable gear ratio of the transmission based upon a minimum of the compared commanded variable gear ratio and the operator requested gear ratio; and
   issuing the target gear ratio to a controller for the transmission, thereby ensuring that the target gear ratio provided to the controller for the transmission does not exceed the maximum commanded variable gear ratio for a current determined value for the downhill slope value in the machine direction of travel.

2. The method of claim 1 wherein the machine comprises a hydrostatic drive system including a hydraulic motor for driving the machine, and wherein the downhill slope value is a slope estimate, and the slope estimate is derived indirectly from machine operating parameters.

3. The method of claim 2 wherein the slope estimate is based upon a current differential pressure across the hydraulic motor.

4. The method of claim 2 wherein the transmission output speed is a motor speed of the hydraulic motor.

5. The method of claim 4 wherein the slope estimate is derived from a rate of change in the motor speed.

6. The method of claim 2 wherein the slope estimate is derived from a rate of change in the current engine speed.

7. The method of claim 1 wherein the downhill slope value is determined from a slope sensor measurement.

8. The method of claim 1 wherein the maximum commanded transmission output speed is established by applying the downhill slope value to a look up table.

9. The method of claim 1 wherein the maximum commanded transmission output speed is established by applying the downhill slope value to a characterizing equation.

10. The method of claim 1 wherein a model, from which the maximum commanded transmission output speed is established, includes at least a range for the downhill slope value for which a maximum commanded transmission output speed is constant.

11. The method of claim 1 wherein a model, from which the maximum commanded transmission output speed is established, includes at least a range for the downhill slope value for which no limit is specified for the maximum commanded transmission output speed.

12. A non-transitory computer-readable medium including computer-executable instructions, executable by a programmed controller, for managing operation of a machine to prevent movable machine components from reaching excessive speed while the machine is traveling down a steep incline, the computer-executable instructions facilitating performing the steps of:
   determining a downhill slope value in a machine direction of travel;
   establishing a maximum commanded transmission output speed in accordance with the determined downhill slope value;
   establishing a maximum commanded gear ratio, for a transmission having a variable gear ratio, based upon the maximum commanded transmission output speed and a current engine speed;
   comparing the maximum commanded variable gear ratio to an operator requested gear ratio;
   establishing a target gear ratio for the variable gear ratio of the transmission based upon a minimum of the compared commanded variable gear ratio and the operator requested gear ratio; and
   issuing the target gear ratio to a controller for the transmission, thereby ensuring that the target gear ratio provided to the controller for the transmission does not exceed the maximum commanded variable gear ratio for a current determined value for the downhill slope value in the machine direction of travel.

13. The non-transitory computer-readable medium of claim 11 wherein the machine comprises a hydrostatic drive system including a hydraulic motor for driving the machine, and wherein the downhill slope value is a slope estimate, and the slope estimate is derived indirectly from machine operating parameters.

14. The non-transitory computer-readable medium of claim 13 wherein the slope estimate is based upon a current differential pressure across the hydraulic motor.

15. The non-transitory computer-readable medium of claim 13 wherein the slope estimate is derived from a rate of change in engine speed.

16. A machine comprising:
   a traction drive;
   an engine;
   a transmission providing power from the engine to the traction drive, the transmission having a variable gear ratio; and
   a programmed controller configured with a non-transitory computer-readable medium including computer-executable instructions for managing operation of the machine to prevent movable machine components from reaching excessive speed while the machine is traveling down a steep incline, the computer-executable instructions facilitating performing the steps of:

determining a downhill slope value in a machine direction of travel;

establishing a maximum commanded transmission output speed in accordance with the determined downhill slope value;

establishing a maximum commanded gear ratio, for the transmission, based upon the maximum commanded transmission output speed and a current engine speed;

comparing the maximum commanded variable gear ratio to an operator requested gear ratio;

establishing a target gear ratio for a variable transmission based upon a minimum of the compared commanded variable gear ratio and the operator requested gear ratio; and issuing the target gear ratio to a controller for the transmission, thereby ensuring that the target gear ratio provided to the controller for the transmission does not exceed the maximum commanded variable gear ratio for a current determined value for the downhill slope value in the machine direction of travel.

17. The machine of claim 16 wherein the machine comprises a hydrostatic drive system including a hydraulic motor for driving the machine, and wherein the downhill slope value is a slope estimate, and the slope estimate is derived indirectly from machine operating parameters.

18. The machine of claim 17 wherein the slope estimate is based upon a sensed differential pressure across the hydraulic motor.

19. The machine of claim 17 wherein the slope estimate is derived from a rate of change in engine speed.

20. The machine of claim 16 wherein the traction drive is a track drive for a tractor.

* * * * *